March 31, 1931.                D. F. HERVEY                1,798,534
                           HANDLE FOR IMPLEMENTS
                         Original Filed May 25, 1929

INVENTOR
David F. Hervey,

Patented Mar. 31, 1931

1,798,534

UNITED STATES PATENT OFFICE

DAVID F. HERVEY, OF LOGANSPORT, INDIANA

HANDLE FOR IMPLEMENTS

Original application filed May 25, 1929, Serial No. 365,976. Divided and this application filed June 3, 1930. Serial No. 459,035.

This application is a division of my co-pending application, Serial No. 365,976, filed May 25, 1929, now matured into Patent No. 1,762,718.

This invention relates to improvements in handles for implements and is specially adapted for use in connection with shovels or hand scoops.

The object of the invention is the provision of a handle embodying such improvements as will render it more convenient and comfortable to use, and which by virtue of such improvements may be used to considerably greater advantage in directing the delivery of material thrown from the shovel.

A further object is the provision of a shovel handle in which there is provided hand grips which will facilitate the convenient tilting of the implement about the longitudinal axis of the handle for directing the material thrown without subjecting the hand and arm to discomforting strain.

A still further object is the provision of a handle for shovels which provides a plurality of grips respectively adapted for use in the various manipulations of the implement and which afford the hand of the operator free and convenient movement from one grip to the other.

The invention may be readily understood by reference to the accompanying drawing in which—

Figure 1:
Fig. 1 is a top view of a shovel showing the invention applied to use.
Figure 2:
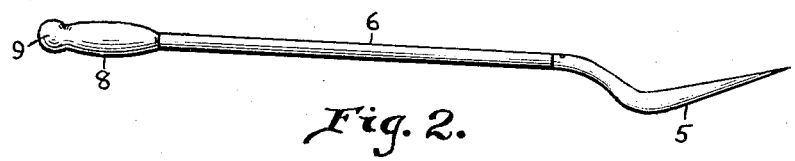
Fig. 2 is a side elevation thereof.

Referring to the drawing in detail, the numeral 5 indicates a conventional form of a shovel blade or scoop which is provided with a straight or curved staff or handle member 6 which for the major portion of its length is of the conventional form and which, for the sake of convenience and reference throughout this specification, will be hereinafter referred to as the "handle."

The invention relates to the structure of the terminal of the handle 6 opposite the scoop 5 and it is optional whether the invention is applied to use as by the separate formation of the handle terminal and its attachment to the body of the handle 6 or by forming the terminal part of the handle as an integral part of the body thereof. In either case, the terminal is a substantially open triangular element, one of the apices of which is connected with the handle 6 and disposing the side member 9 thereof in a position perpendicular to the axis of the handle 6 but parallel to the edge of the blade or scoop 5. The arrangement of the grip 9 is turned to an angle of substantially 90° and is approximately the same as the position of the hand grip of shovels in ordinary use. That is to say, the grip 9 is disposed so that it is grasped in the hand of the operator with the palm up and may be utilized to an advantage in manipulation of the implement to fill the scoop 5. The grip 9 also facilitates the withdrawal of the implement from the pile after having filled the scoop.

The remaining sides of the triangular terminal of the handle 6 which extend divergently in opposite directions are suitably shaped to provide complementary hand grips 8 and, being disposed in angular relation to the axis of the handle 6, may by being grasped in the hand of the operator be effectively used in causing the shovel to be tilted about its longitudinal axis in the act of distributing or delivering the material, either one or the other of the grips 8 being utilized for the purpose as best suits the convenience of the operator as indicated by the lateral direction in which it is desired to effect delivery.

In the delivery of the contents of a shovel, as for instance in delivering and distributing fuel within a furnace, difficulty has been experienced in the past in causing a lateral deflection of material from the shovel to the right, although the lateral deflection to the left of such material may be conveniently accomplished. The difficulty in the lateral deflection of the material is due to the necessity of twisting the forearm and hand to the right, with the palm up-raised as usual. With the hand in this position the natural limit of further twisting motion of the forearm and hand is approximately reached, and further twisting as may be necessary to cause deflection of the material to the right is practically impossible. By the present invention this objection is overcome, that is, the shovel can be manipulated with ease and convenience, and the material can be directed or delivered therefrom with convenience and accuracy. Such convenience and accuracy are obtained by the hand, because either one or the other of the hand grips 8 is used for turning the implement about the axis of the handle 6, according to the lateral direction in which it is desired to effect delivery from the scoop.

What I claim is:

1. In an implement, a blade, a handle carried by the blade and a substantially triangular element carried by the terminal of the handle forming a plurality of hand grips, said triangular element lying substantially parallel to the blade.

2. In an implement, a blade, a handle carried by the blade and divergent hand grips carried by the terminal of the handle and disposed obliquely thereto.

3. In an implement, a blade, a handle carried by the blade and divergent hand grips carried by the terminal of the handle and disposed obliquely thereto, and a terminal hand grip connecting the divergent hand grips.

In testimony whereof I have hereunto set my hand.

DAVID F. HERVEY.